C. R. THURMAN.
DUST COLLECTOR.
APPLICATION FILED MAY 23, 1912.
1,043,551.
Patented Nov. 5, 1912.
2 SHEETS—SHEET 2.
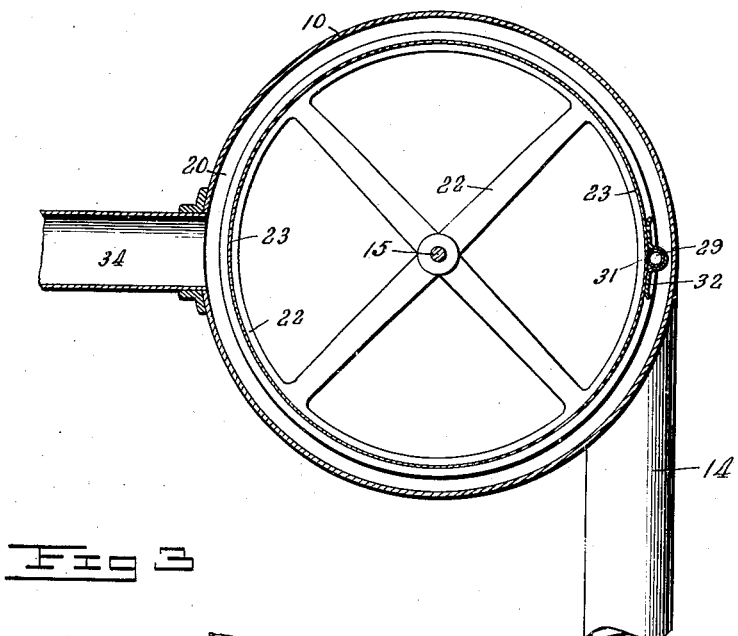
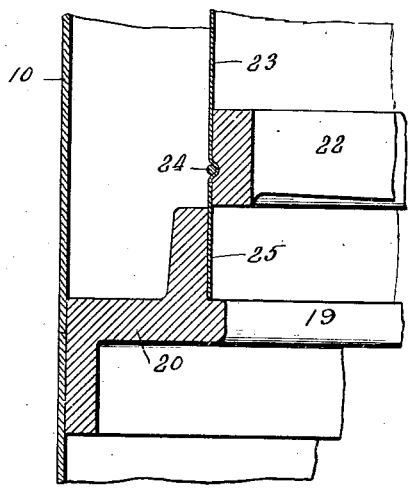
Witnesses
H. C. Rolnick
A. P. Hollingsworth
Inventor
Charles R. Thurman
By Jaques, Cushman & Rea
Attorney

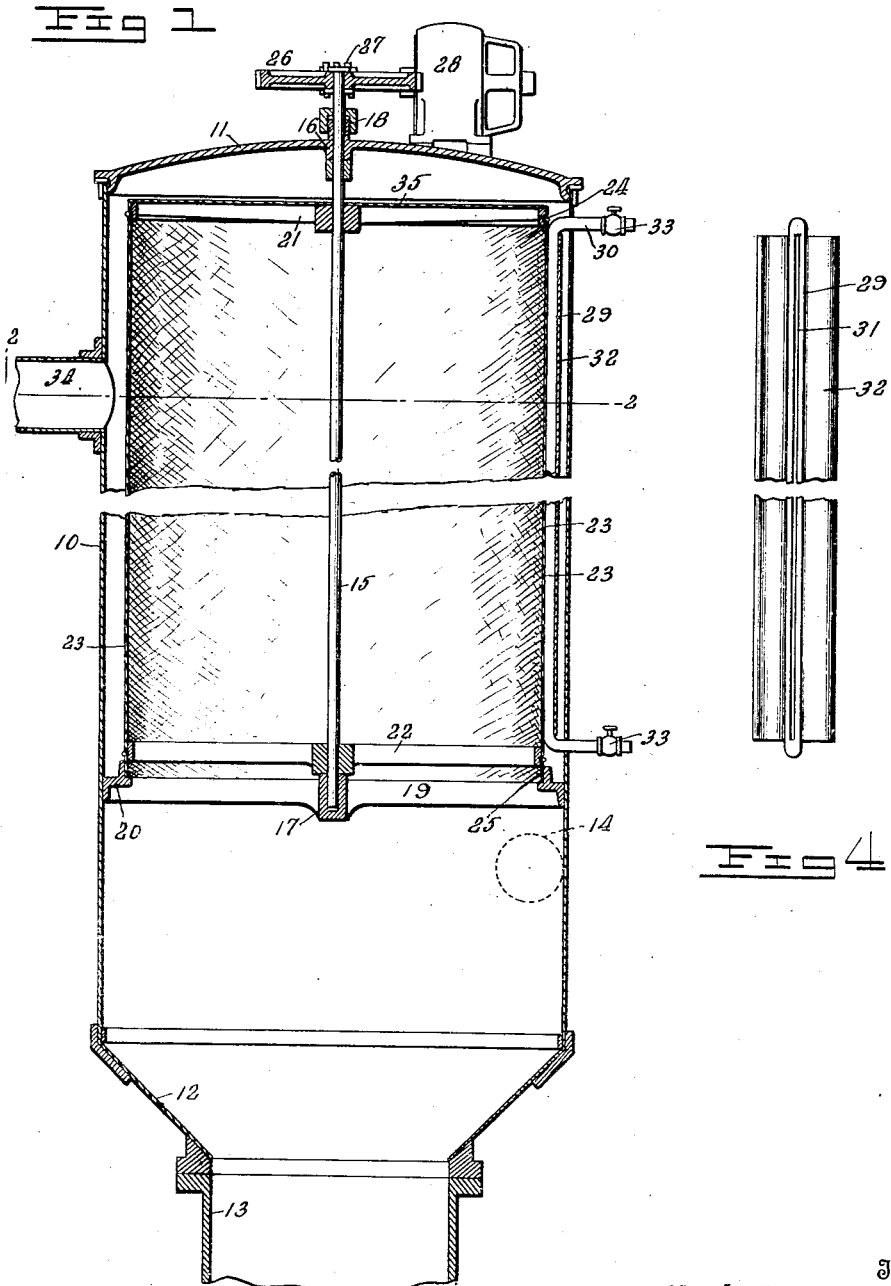

UNITED STATES PATENT OFFICE.

CHARLES R. THURMAN, OF PITTSBURGH, PENNSYLVANIA, ASSIGNOR TO ELECTRIC RENOVATOR MANUFACTURING COMPANY, OF PITTSBURGH, PENNSYLVANIA, A CORPORATION OF PENNSYLVANIA.

DUST-COLLECTOR.

1,043,551.   Specification of Letters Patent.   Patented Nov. 5, 1912.

Application filed May 23, 1912. Serial No. 699,355.

*To all whom it may concern:*

Be it known that I, CHARLES R. THURMAN, a citizen of the United States, residing at Pittsburgh, in the county of Allegheny and State of Pennsylvania, have invented new and useful Improvements in Dust-Collectors, of which the following is a specification.

This invention relates to dust collectors for use with pneumatic cleaning systems and machines, particularly such as operate by vacuum or suction.

The object of the invention is to provide a receptacle of suitable form and dimensions into which dust laden air is drawn tangentially to give it a whirling motion and thus set up a centrifugal separation of the heavier parts of the dust and dirt from the air. Leaving the receptacle through a suitable outlet, the air traverses a screen of textile material and is thoroughly strained, the dust remaining more or less on the wall of the screen from which it is removed by causing a current of air to pass through the screen in a reverse direction. To accomplish this, the screen is preferably made in the form of a cylinder and rotated slowly past a suitably arranged inlet communicating with the atmosphere. As the screen slowly traverses this inlet, the suction of the apparatus draws the outer air inwardly through the same which then passes through the screen from without and blows the dust from its inner side.

With this as the principal object, the invention consists of the novel construction, combination and arrangement of parts hereinafter described in detail, set forth in the appended claims and illustrated in the accompanying drawings, in which—

Figure 1 is a vertical longitudinal sectional view of the improved dust collector. Fig. 2 is a cross sectional view of the same on the line 2—2. Fig. 3 is an enlarged detail view of a feature of the invention. Fig. 4 is an elevation of the screen cleaning air inlet. Fig. 5 is a cross sectional view of the same.

In the drawings, 10 indicates a receptacle or tank, preferably cylindrical in shape, provided with a tightly fitting but removable closure 11 at the top, and a conical bottom 12 to direct dirt and dust through a suitable connection 13 into a reservoir, not shown, where it collects until such time as is convenient for emptying. Dust laden air is drawn by suction into the tank through an inlet 14 connected at a tangent to the tank whereby the air is given a whirling motion within the tank which tends to assist the separation of the dirt and dust by centrifugal force.

In the longitudinal center of the tank 10 is a shaft 15 carried in bearings 16 and 17, the bearing 16 being on the closure 11 and provided with a stuffing gland 18 to prevent air entering around the shaft. The bearing 17 is supported by arms 19 radiating toward and connected to a ring 20 fastened to the wall of the tank, a suitable distance below the top of the tank. Attached to the shaft near the respective bearings are two equal spiders 21 and 22 with annular peripheries, slightly less in diameter than the tank, between which spiders is stretched a cylindrical screen 23 of textile material of such character as will permit air to pass through with little or no impediment, but will form a perfect barrier to the passage of all dust, even the finest. The cylindrical screen 23 is open at the bottom to permit air to be purified entering the same, but is closed at its top by a preferably impervious sheet 35 so that all outgoing air must pass through the screen wall. The screen 23 may be fastened to the spiders in any desired manner, but in the present instance the spiders are shown each with a peripheral groove into which a fastening cord or wire 24 binds the ends of the cylindrical screen. The lower end 25 of the screen projects a short distance below the spider 22 and overlaps the ring 20 against which it is held by the air pressure to prevent the escape or leakage of dirt laden air around the edge of the screen.

Connected to the tank 10 at a suitable point opposite the screen 23 is an outlet pipe 34 for air free of dust leading to the suction apparatus of any well known type, not shown.

The upper end of the shaft 15 projecting through the gland 18 has attached to it, in the present instance, a worm wheel 26 driven by a worm 27 on the shaft of a small electric motor 28 fastened on the closure 11. By this means the screen 23 is rotated at the required speed.

Within the casing or tank 10 close to or in contact with the outer surface of the screen cloth 23 is a pipe 29 extending parallel with the axis of the screen and from end to end. The ends 30 of this pipe project through the wall of the tank into the atmosphere for the admission of air which escapes from the pipe through a narrow slot 31 formed therein from end to end on the side next the screen. Projecting laterally from each side of the pipe throughout the length of the slot 31 is a wing or shield 32, against which wings the screen cloth is forced by the air pressure and passage of air outwardly through such portion of the screen temporarily interrupted. The suction within the tank however draws air in through the ends 30 of the pipe 29 and through the slot 31 which flows in reverse direction through the screen and blows the dust from the inside thereof. The amount of inflowing air may be regulated by the width of the slot 31, or air valves 33 may be attached to the ends 30 of the pipe 29.

In operation, the outlet 34 is connected to a suction apparatus and a partial vacuum created in the tank or reservoir 10. Dust laden air is drawn through the inlet 14 into the tank at a tangent and whirls about therein. Rising upwardly within the screen, the air passes through the same to the outlet 34, leaving the dust and dirt on the inside of the screen wall. The rotation of the screen brings every part of it successively across the air pipe 29 and the wings or shields 32 momentarily stopping the flow of air outwardly through the part of the screen overlying the wings. That portion of the screen in front of the slot 31 in the pipe 29 is subjected to a current of air from the pipe flowing in a reverse direction, that is, from without inward, the effect of which is to blow the dust from the inside of the screen so that it will fall to the bottom of the tank 10 and thence into the reservoir below. It will be understood that during operation there is always a partial vacuum in the tank and naturally a current of air will flow inward through the pipe 29. The shields or wings 32 are extended on both sides of the pipe 29 to stop the outflow of air through the screen adjacent the pipe, which if permitted would, by continually depositing dust on the screen within the influence of the inflowing air, counteract the cleaning operation of said inflowing air.

What I claim is:

1. A dust collector comprising a casing into which a current of dust laden air is directed, a screen in said casing through which all of said air passes in one direction to strain the dust therefrom, means for momentarily cutting off the passage of screened air through a limited portion of said screen, and means for directing at the same time a stream of fresh air from without the casing through said limited portion of the screen in reverse direction to clean the same from accumulated dust.

2. A dust collector comprising a casing through which a current of dust laden air is directed, a rotatable screen in said casing through which said air passes in one direction to strain it from dust, means adjacent said screen adapted to momentarily check the flow of air through successive limited portions of the screen as it rotates, and means for directing a stream of fresh air generated by the current flowing through the casing to pass in reverse direction through that portion of the screen covered by the checking means to clean the dust from the screen.

3. A dust collector comprising a casing through which a current of dust laden air is directed, a rotatable screen in said casing through which said air passes in one direction to strain it from dust, a shield in the casing frictionally in contact with the screen to check the flow of air through that portion of the screen bearing in its rotation against the shield, and means for directing a stream of fresh air generated by the current flowing through the casing to pass in reverse direction through the portion of the screen cut off by said shield to remove the dust therefrom.

4. A dust collector comprising a casing through which a current of dust laden air is directed, a rotatable screen in said casing through which said air passes in one direction to strain it from dust, a shield in the casing frictionally in contact with the screen to check the flow of air through that portion of the screen bearing in its rotation against the shield, and means for causing a stream of fresh air to be drawn by suction through the screen in reverse direction through the portion of the screen cut off by said shield to remove the dust therefrom.

5. A dust collector comprising a casing through which a current of dust laden air is directed, a rotatable screen in said casing through which said air passes in one direction to strain it from dust, a shield in the casing frictionally in contact with the screen to check the flow of air through that portion of the screen bearing in its rotation against the shield, and a pipe having a longitudinal slot in its side bearing on the screen adjacent the shield and opening into the atmosphere to permit a flow of air in reverse direction through the screen while the screening current is cut off by the shield.

6. A dust collector comprising a casing into and through which a current of dust laden air passes tangentially, a cylindrical screen mounted therein and adapted to rotate and through which said air passes in one direction to strain it from dust, a shield in said casing extending longitudinally thereof in contact with a limited portion of the screen to prevent the passage of air through the screen while in contact with the shield, and a pipe extending longitudinally of said shield opening into the atmosphere at its ends and having a longitudinal slot bearing on the screen through which a current of fresh air passes to and through the screen in reverse direction to the current to be strained for cleaning the dust from the screen.

7. A dust collector comprising a casing through which a current of dust laden air is directed, a screen in said casing through which said air passes in one direction to strain it from dust, an orifice in said casing, means for causing a stream of fresh air to flow from said orifice through said screen in a reverse direction to that of the dust laden air, and means for bringing all parts of the screen successively within the range of action of said stream of fresh air to remove the dust therefrom.

8. In a dust collector containing a rotating cylindrical screen for straining dust from air drawn through the screen by suction, of means for momentarily interrupting the passage of dust-laden air to a limited portion of said screen and direct at the same time a current of fresh air against said limited portion of the screen in a reverse direction for removing the dust therefrom, said means comprising a pipe provided with a longitudinal slot and bearing against said screen and communicating at its ends with the atmosphere, a valve on each end of said pipe, and a lateral projection on the pipe on each side of said slot in contact with the screen.

In testimony whereof I have hereunto set my hand in presence of two subscribing witnesses.

CHARLES R. THURMAN.

Witnesses:
    MAX H. SROLOVITZ,
    HARRIET R. PURVIS.

---

Copies of this patent may be obtained for five cents each, by addressing the "Commissioner of Patents, Washington, D. C."